United States Patent [19]

Wallin

[11] Patent Number: 5,054,739
[45] Date of Patent: Oct. 8, 1991

[54] AUTOMATIC LEVELLING DEVICE

[76] Inventor: Jan Wallin, Hesse 55, S-781 96 Borlänge, Sweden

[21] Appl. No.: 411,487

[22] PCT Filed: Mar. 11, 1987

[86] PCT No.: PCT/SE87/00122
§ 371 Date: Sep. 6, 1989
§ 102(e) Date: Sep. 6, 1989

[87] PCT Pub. No.: WO88/06894
PCT Pub. Date: Sep. 22, 1988

[51] Int. Cl.$^5$ .......................................... F16M 13/00
[52] U.S. Cl. .................................. 248/550; 248/371; 297/314
[58] Field of Search ............... 248/550, 371, 291, 398, 248/185, 188.2, 188.3; 297/314, 315, 347; 280/6 R, 6 H

[56] References Cited

U.S. PATENT DOCUMENTS

| | | | |
|---|---|---|---|
| 2,128,273 | 8/1938 | Stevens | 248/371 X |
| 2,202,009 | 5/1940 | Knox | 248/371 UX |
| 2,790,119 | 4/1957 | Konet | 248/371 UX |
| 2,872,200 | 2/1959 | Kroll | 248/371 UX |
| 2,893,134 | 7/1959 | Shea | 248/314 UX |
| 2,966,937 | 1/1961 | Rydberg | 297/314 X |
| 3,021,107 | 2/1962 | Salo . | |
| 3,269,685 | 8/1966 | Wallace | 248/371 X |
| 3,315,934 | 4/1967 | Taylor | 297/314 X |
| 3,341,165 | 9/1967 | Taylor | 297/314 X |
| 3,741,511 | 6/1973 | Streeter | 248/371 |
| 3,836,162 | 9/1974 | Felkner | 280/6 R |
| 4,095,770 | 6/1978 | Long . | |

FOREIGN PATENT DOCUMENTS

| | | |
|---|---|---|
| 2142046 | 2/1973 | Fed. Rep. of Germany . |
| 2442039 | 4/1975 | Fed. Rep. of Germany . |
| 2537174 | 3/1977 | Fed. Rep. of Germany . |
| 2709123 | 9/1977 | Fed. Rep. of Germany . |
| 2637411 | 2/1978 | Fed. Rep. of Germany . |
| 1558324 | 1/1969 | France . |
| 2450172 | 9/1980 | France . |
| 2472491 | 7/1981 | France .............................. 297/314 |
| 75146753 | 7/1977 | Sweden . |
| 431430 | 2/1984 | Sweden . |

OTHER PUBLICATIONS

Copy of International Search Report for PCT Application No. PCT/SE87/00122.

Primary Examiner—J. Franklin Foss
Attorney, Agent, or Firm—Sandler, Greenblum & Bernstein

[57] ABSTRACT

Automatic levelling device for a vehicle seat, having at least one linearly working device element operatively connected to the vehicle seat, which is pivotal in relation to the vehicle about at least one axis and to the vehicle. The device is provide with at least one detecting element for detecting the position of the seat in relation to the horizontal plane, and when the seat deviates from the horizontal plane, the detecting element emits a signal to the drive means for returning the seat to horizontal position. The device is provided with an upper plate for supporting the seat, which is pivotally journalled in a lower plate intended to be mounted to the vehicle. The drive element is arranged completely within the space delimited between the upper and lower plates in a position substantially parallel with the lower plate, and includes a linearly working control rod that is retractable and extendable substantially parallel to the lower plate.

18 Claims, 6 Drawing Sheets

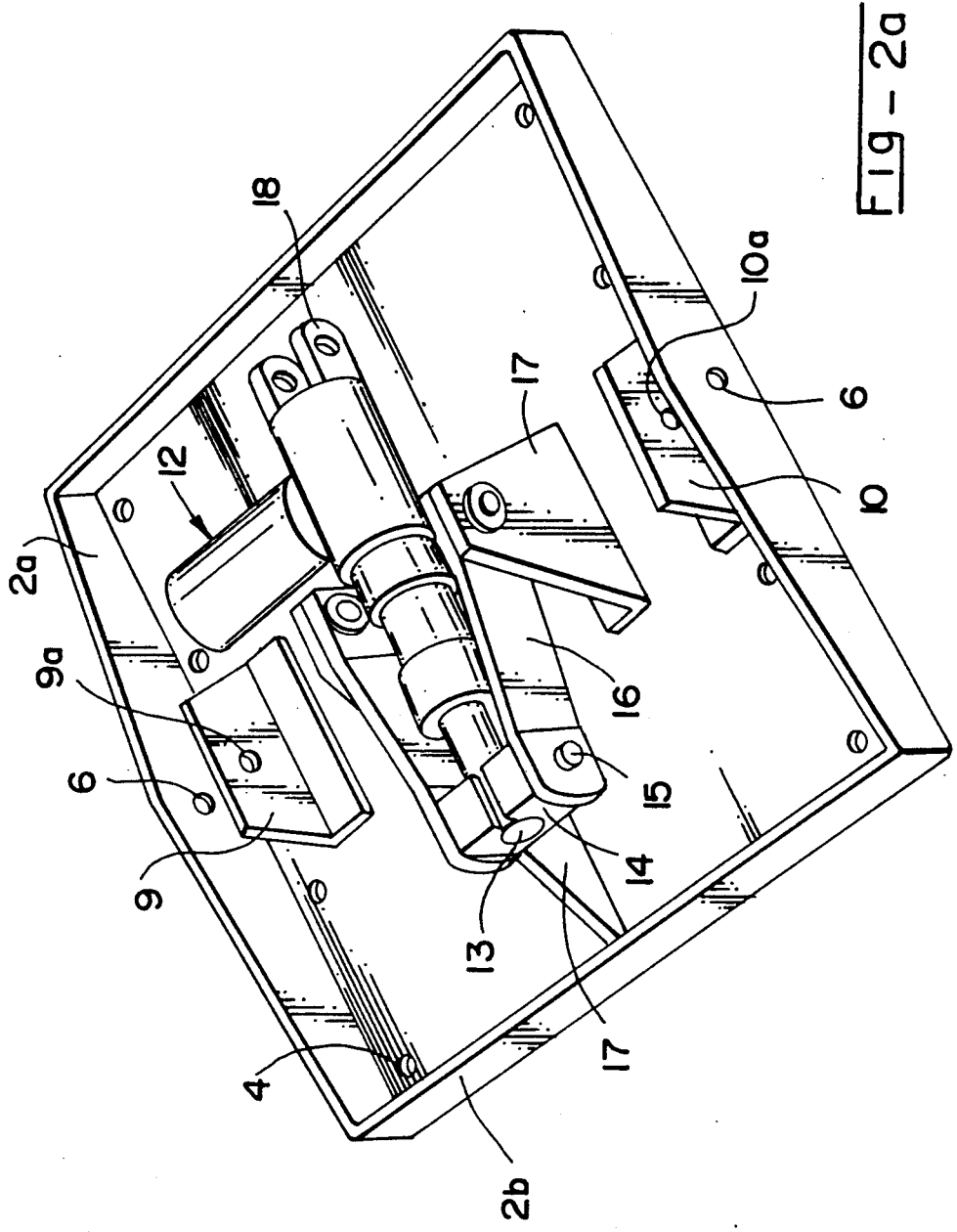

AUTOMATIC LEVELLING DEVICE

BACKGROUND OF THE INVENTION

1. Field of the Invention

The invention relates to an automatic levelling device for a vehicle seat, having at least one linearly working drive means operatively connected on the one hand to the vehicle seat, which is pivotable relative to the vehicle about at least one axis, and on the other hand to the vehicle, and having at least one detecting means for detecting the position of the seat relative to the horizontal plane, the detecting means, when the seat deviates from the horizontal plane, delivering a signal to the drive means for returning the seat to the horizontal position.

2. Discussion of Background and Relevant Information

Devices of the kind indicated above are primarily used for driver's seat in tractors and other construction or working vehicles and cross-country vehicles. The purpose thereof is above all to prevent back-injuries and pain in the back for the driver of such vehicles when driving over rough terrain, for instance for the driver of a tractor during plowing when one of the wheels of the tractor runs on unplowed ground and the other wheel runs in a plowed furrow. Should the driver's seat be fixed in such a situation this would mean that the body of the driver would be inclined or tilted, which might lead to the above-mentioned trouble, especially if the ground is also rough so that the driver is constantly subjected to jolts and vibrations in such a position. Apart from this, a device of the above described kind also permits a much more comfortable driving position which enhances the capability of manoeuvering the vehicle, for instance when driving on a bank.

Devices of the kind indicated above are previously known through for instance U.S. Pat. Nos. 3,315,934 and 3,021,107, wherein fluid operated cylinders are used as drive means. The fluid operated cylinders are provided substantially vertically on each side of the pivot axis of the pivotal connection between the vehicle seat and the vehicle. In order to control the drive means in such a way that it restores the horizontal position of the seat when the vehicle is inclined, both these prior art devices employ a valve having an inertia sensitive valve member therein for detecting the lateral inclination.

These known solutions have the disadvantage that the devices are relatively bulky, especially due to the positioning of the drive means, and thus occupy an unnecessarily large-portion of the normally narrow space at the driver's seat of a vehicle of the kind in question, and may even be impossible to install on an existing vehicle, due to lack of space.

Another disadvantage of these prior art devices lies in the fact that they employ hydraulic drive means intended to be supplied from the normal hydraulic system of the vehicle. The disadvantage of this solution is primarily that an operation of the levelling device under unfortunate circumstances may lead to a pressure drop in the hydraulic system of the vehicle so that this can not adequately supply other vital devices connected to the hydraulic system, with the result that the operation of these devices may be obstructed in such a case. Furthermore special measures will have to be taken for reliable drawing of the hydraulic lines so that there is no danger of crushing or pulling loose the same. Finally, there is always a danger of leakage at the connection of the hydraulic lines, at the control valve or at the drive means themselves, and such a leakage is absolutely not desirable adjacent the driver's seat.

U.S. Pat. No. 2,966,937 does disclose a device of the kind described in the introduction, which employs electrical motors for adjusting the position of the seat. However, this known device also suffers from the disadvantage of being bulky, in this case especially in its height. In detail this device employs rotary drive means which through a screw and worm gear operate a threaded rod vertically positioned between the vehicle seat and the vehicle for adjusting the position of the vehicle seat when being driven up and down. Thus, this known device requires that a relatively large vertical space be available at the driver's stand so that the adjusting apparatus can be mounted between the seat and the vehicle without unduly restricting the remaining space above the seat. This means that the known device cannot be used for subsequent installment in driving compartments on existing vehicles where the vertical space is already restricted.

Finally, the device according to U.S. Pat. No. 2,966,937 is relatively complex and employs a great number of movable parts requiring machining. Due to this fact the complete device is also relatively expensive.

SUMMARY OF THE INVENTION

The object of the present invention is therefore to provide a device of the kind mentioned in the introduction, which device is compact and requires a minimum of space so that it can be installed in practically any vehicle, and which is at the same time simple and unexpensive to manufacture.

BRIEF DESCRIPTION OF THE DRAWINGS

FIG. 2a is a perspective view of the upper plate dismounted from the lower plate.

DETAILED DESCRIPTION OF THE PREFERRED EMBODIMENTS

Figure 1:
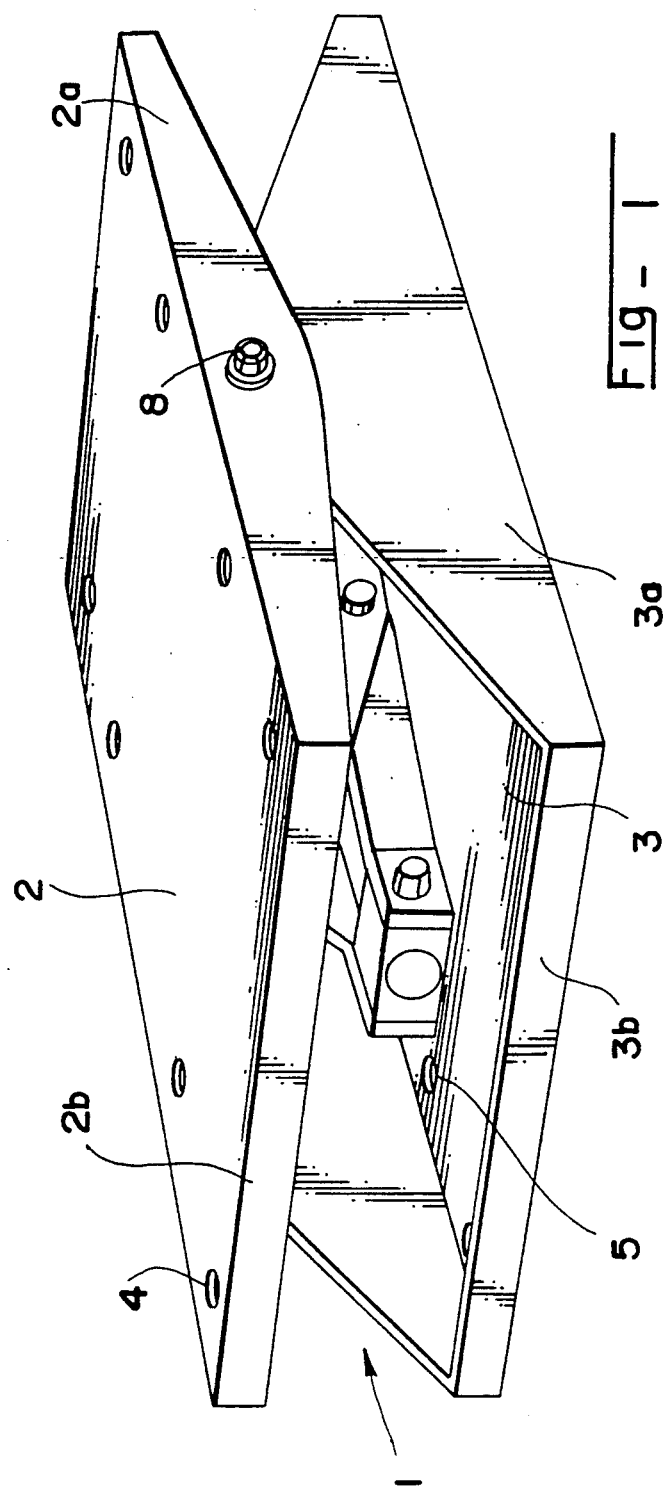
FIG. 1 is a perspective view of an embodiment of the device according to the invention.
Figure 2B:
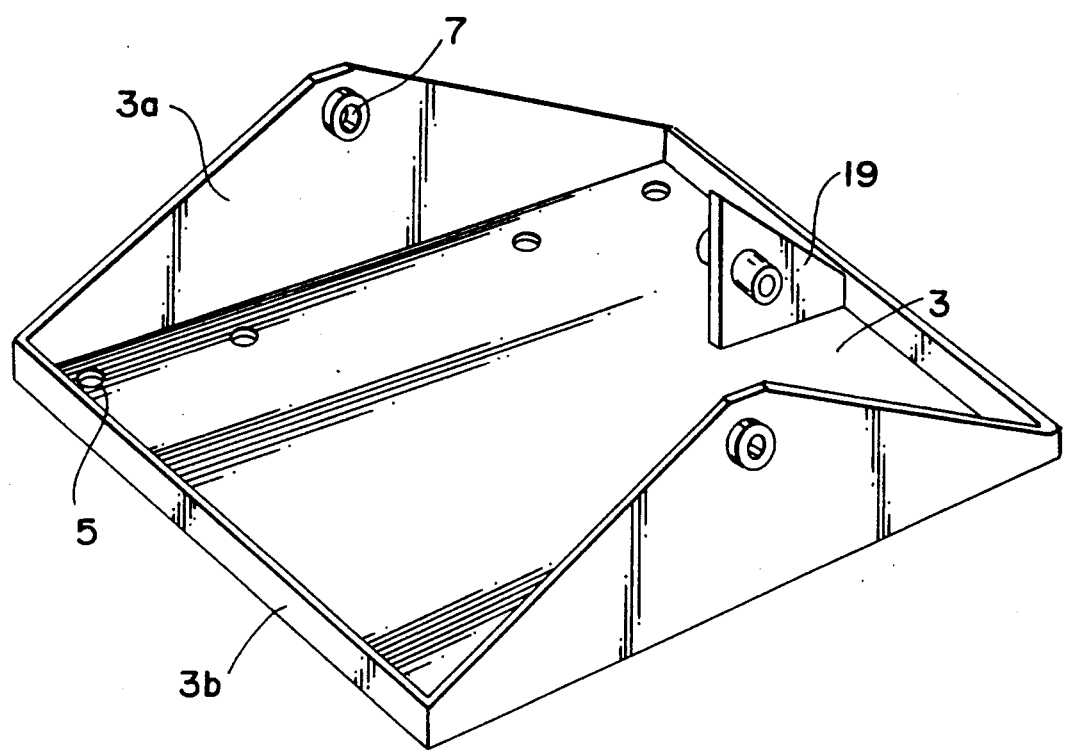
FIG. 2b is a perspective view of the lower plate with dismounted upper plate and dismounted drive means.

As is clear especially from FIGS. 1, 2a and 2b the levelling device 1 according to the invention basically consists of an upper plate 2 and a lower plate 3 which in the illustrated embodiment have a substantially square shape, as seen in a plane view, but which may naturally have any other suitable shape. The upper plate 2 is provided with a number of mounting holes 4 for mounting a driver's seat 11 (FIG. 4) thereon and the lower plate 3 is provided with a number of mounting holes 5 for mounting the device directly on the vehicle or alternatively on a bracket or console.

The upper plate 2 and the lower plate 3 are both provided with substantially triangular side walls 2a and 3a, respectively, which are positioned at two opposite side edges thereof and perpendicularly to the plates. The side walls 2a, 3a are, adjacent the apex of their triangular shape, provided with holes 6 and 7, respectively, for receiving a bearing 8 for pivotal mounting of one plates relative to each other. The bearing is not illustrated in detail and may be of any suitable kind permitting a relatively frictionless pivoting of the plates in relation to each other.

In order to stabilize the pivotal connection between the plates, the upper plate is preferably provided with a support plate 9 which is fixed to, for instance welded to, the bottom side of the upper plate 2 adjacent and inwardly of one of the side walls 2a. This support plate is provided with a hole 9a corresponding to the hole 6 of the side wall 2a. In the same manner a support plate 10 is welded to the bottom side of the upper plate 2 adjacent and inwardly of the opposite side wall 2a in order to support the other pivotal mounting. Likewise this support plate 10 is also provided with a hole 10a corresponding to the hole 6 in the other side wall 2a of the upper plate.

For strengthening the upper plate 2 as well as the lower plate 3, these are preferably bent upwardly at the edges thereof not provided with side walls. These upwardly bent edges 2b and 3b, respectively, increase the torsional strength or stiffness of the plates and stabilize them.

For actuating the pivoting of the upper plate 2 about the bearing 8 there is, according to the invention, employed a linearly working drive means 12 which is illustrated somewhat schematically in FIGS. 2a, 3a–c and 5. In order to avoid load on the hydraulic system of the vehicle and in order not to run the risk of leakage of hydraulic fluid in the driver's compartment the device according to the invention preferably employs an electrical adjusting means such as SKF type CATR/L 12. The drive means 12 has a retractable and extendable operating rod 13 the outer free end of which is fixed in a block 14 such as by means of bolts 15 extended through the block 14 and screwed into threaded bores in the end portion of the operating rod 13.

On each side of the operating rod 13, the block 14 is provided with arms 16 which are firmly connected thereto and which at their opposite ends are pivotally mounted in relation to the upper plate 2. The arms 16 are pivotally mounted in further support plates 17 which are welded to the upper plate 2 at a sufficient distance from each other to make sure that the drive means 12 can be received therebetween. In order not to obstruct the pivotal movement of the upper plate in relation to the lower plate 3 the support plates 17 slope down towards the plate 2, and one of the support plates is illustrated extended all the way down to the edge of the plate in order to further increase the stability. It is possible to give both support plates this shape.

The housing of the drive means 12 is provided with an attachment 18, usually in the shape of a clevis, by means of which it is pivotally connected to a support plate 19 welded to the upper side of the lower plate 3, whereby the pivotal connection is achieved in a well-known manner by means of a pivoted mounting 20 which is not described in detail but which could for instance consist of a pin and a bushing.

In order to increase the stability and to lower the load on the drive means 12 this is, in the preferred embodiment, mounted at a position substantially centrally between the side walls 2a, 3a of the plates 2, 3. However, in certain cases it may be desirable to mount the drive means displaced to one side (FIG. 5), whereby one of the arms, as illustrated, may be journalled in the support plate 10, which in this case is given a greater height, so that one of the further support plates 17 can be eliminated.

Figure 5:
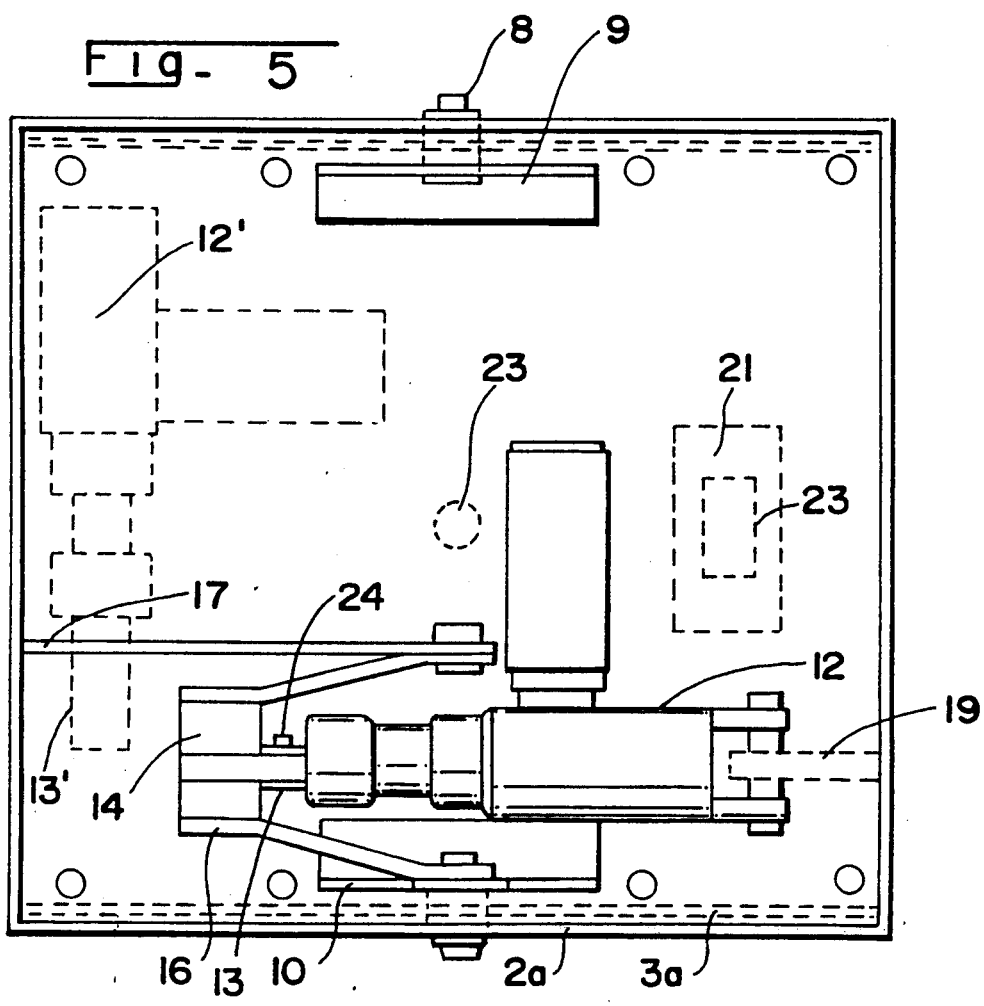
FIG. 5 is a bottom plane view of the upper plate, illustrating a modified embodiment with two drive means.
Figure 3B:
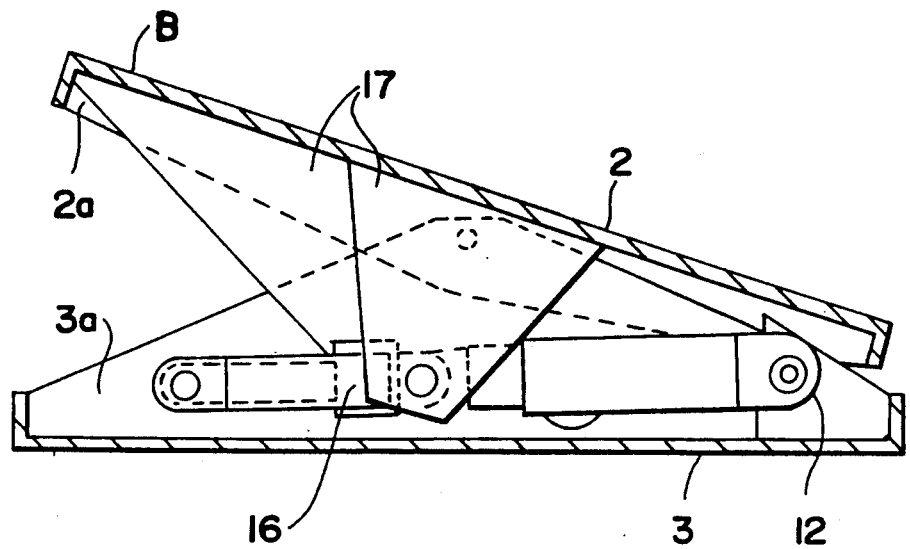
Figure 3C:
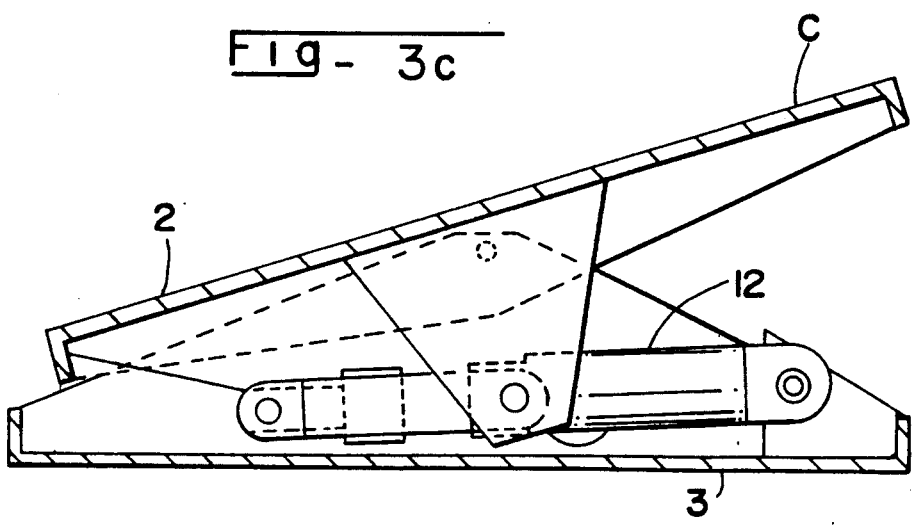

For controlling the drive means 12, which is powered through the ordinary electrical system of the vehicle or possibly through a separate battery, there is provided a control unit 21 which is only schematically indicated in FIG. 5. The control unit 21 is preferably an electronic control circuit composed of standard components and therefore not necessitating any detailed description thereof. The electronic circuit is provided in a protective casing which preferably also contains a not shown detecting means for detecting the position of the upper plate 2 and thus also for the seat 11 in relation to the horizontal. In this case, when the detecting means is also contained in the casing of the control unit 21 this casing should naturally be mounted on the bottom side of the upper plate 2, as schematically illustrated in FIG. 5. The detecting means may be of any suitable kind, such as a mercury switch, an inertia sensitive pendulum or a photo-cell.

When the detecting device detects tilting of the upper plate 2 in either direction in relation to the horizontal plane it delivers a corresponding signal to the control unit which is preferably provided with a time delay function of for instance 1 to 3 seconds ensuring that the drive means is not activated by transitory tilts, so that the levelling device is not activated by smaller unevenness of the ground.

Figure 3A:
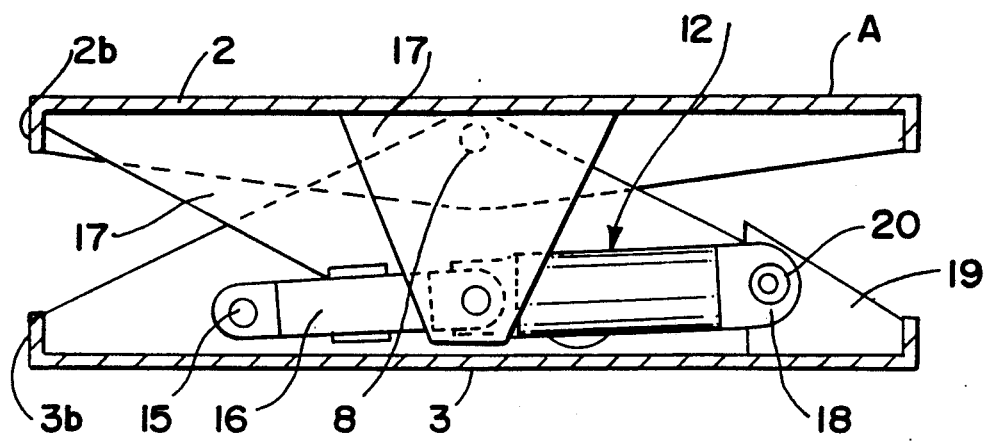
FIGS. 3a–c are end views of the device according to the invention, with parts of the upper and lower plates cut away in order to illustrate the positioning of the drive means, and illustrating alternative adjusted positions for the upper plate.
Figure 4:
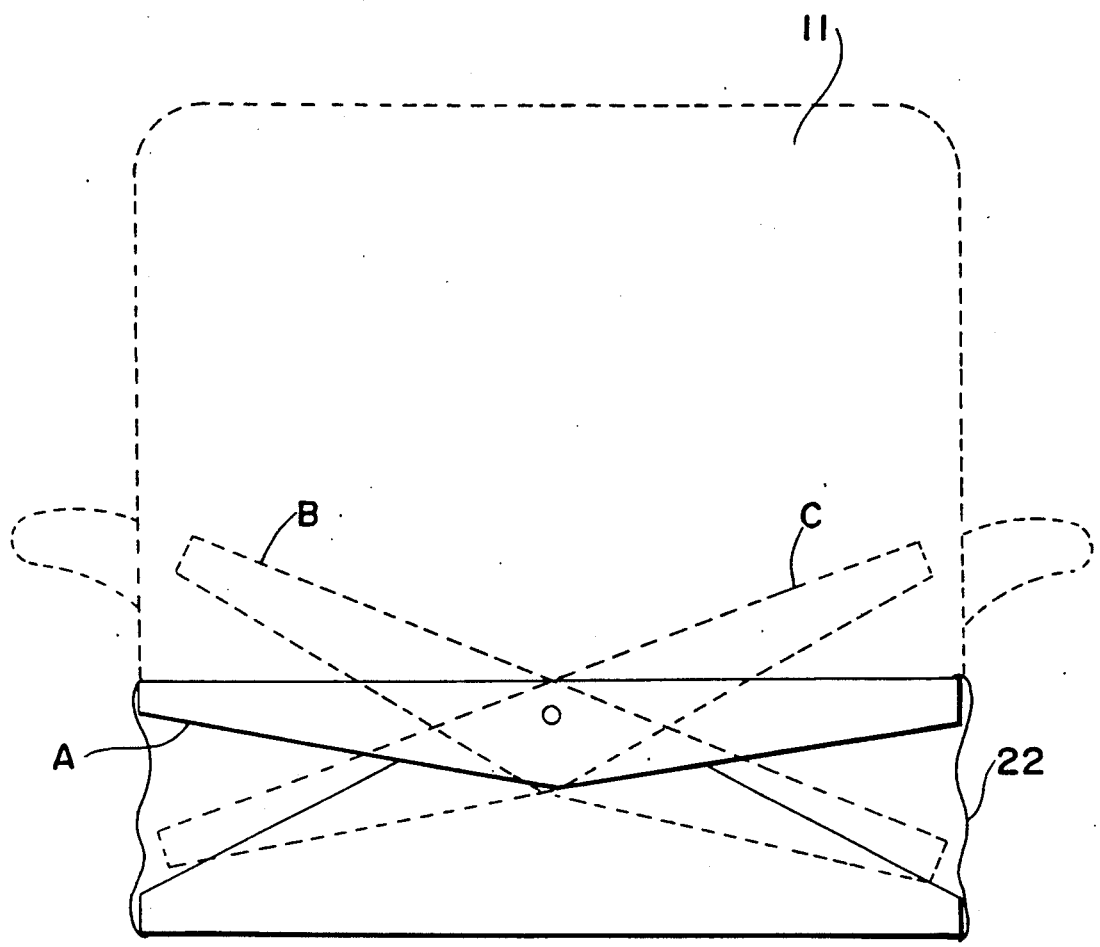
FIG. 4 is an end view of the apparatus according to the invention illustrating the alternative adjustment positions for the upper plate and a schematically indicated driver's seat mounted thereon.

If the tilt of the vehicle remains after the time delay and the control unit 21 activates the drive means 12 for extending the control rod 13 this movement is transmitted to the upper plate 2 through the arms 16 and their connections with the support plates 10 and 17 so that the upper plate 2 is inclined or tilted from the position A in FIGS. 3a and 4 and towards the position B (FIGS. 3b and 4), whereby this movement continues until the detecting means detects that the upper plate 2 and thus the seat are in a horizontal position again. When the control rod 13 of the drive means 12 is retracted this movement is likewise transmitted to the upper plate 2 through the arms 16 and the support plates 17 for swinging the upper plate towards the position C of FIGS. 3c and 4.

In an embodiment where the distance between the upper and lower plates 2 and 3 is approximately 10 to 11 centimeters, when they are in a position parallel with each other, the upper plate 2 according to the invention may be tilted or pivoted approximately 13° to 15° in either direction in relation to the lower plate 3. However, the drive means 12 preferably comprises limit switches 24 in connection with the control rod 13, by means of which limit switches the stroke of the control rod and thereby the angles may be optionally adjusted. A typical value of the angle of adjustment has been found to be approximately 10° in either direction.

For reasons of appearance and most of all also for protecting the components a rubber bellow 22, which is schematically illustrated in FIG. 4, is preferably fitted over the upper and lower plates 2 and 3, thereby preventing dirt and other pollutions from entering the space between the plates.

Although the device has so far been described with specific reference to an embodiment where the upper plate 2 is only pivotal about an axis parallel with the lower plate it should also be realized that within the scope of the invention the device may also be modified in such a way that the upper plate is adjustable about two axis which are positioned substantially perpendicularly in relation to each other.

By such a modification the side walls 2a and 3a of the plates and the bearings 8 attached thereto may be eliminated and the bearings 8 may be replaced by a central support 23 which is schematically illustrated in FIG. 5 and which permits pivoting of the upper plate 2 about two axis which are parallel in relation to the lower plate. For pivoting the upper plate a second drive means 12', schematically illustrated in FIG. 5, is mounted such that its control rod 13' is extended perpendicularly to the control rod 13 of the first drive means 12. In this case, the upper plate 2 is naturally provided with corresponding additional support plates and arms and is the lower plate is provided with a corresponding additional support plate. The control unit 21 is also provided with a second detecting means for detecting the tilt of the upper plate about the additional axis. This modified embodiment does not bring about any increase in the vertical height of the device but possibly the dimensions of the upper and lower plates will have to be increased somewhat to make room for the two drive means. Moreover it may be necessary to give the support plates a specific shape in order to make room for the two drive means, but such modifications lie well within the competence of a man skilled in the art.

The invention should also in other respects be considered to encompass modifications and alterations obvious to a man skilled in the art, and the scope of the invention should therefore only be restricted by the enclosed patent claims.

I claim:

1. Automatic levelling device for a vehicle seat comprising:
   an upper plate capable of supporting a vehicle seat;
   a lower plate capable of being mounted on a vehicle;
   said upper plate being pivotally journalled to said lower plate about at least one axis;
   at least one linearly operable drive means for moving said upper plate with respect to said lower plate, said at least one drive means being mounted between and completely within the space delimited by said upper plate and said lower plate, and said at least one drive means including a linearly extending control rod which is extendable and retractable substantially parallel to said lower plate, said control rod having a free end that is firmly connected to a block by a pair of arms, said pair of arms being firmly attached to said block at one end and pivotally mounted in a first support plate depending from said upper plate at another end; and
   at least one detecting means for detecting the horizontal position of said upper plate and for delivering a signal to said at least one drive means for returning the seat to a substantially horizontal position.

2. The device according to claim 1, wherein said at least one drive means include a housing which is pivotally attached to a second support plate extending substantially perpendicular to said lower plate.

3. The device according to claim 1, further including angle adjustment means for permitting tilting of said upper plate in relation to said lower plate around said at least one axis at an angle of about 13° to 15°.

4. The device according to claim 3, wherein said angle adjustment means permits tilting of said upper plate in relation to said lower plate at an angle of 10°.

5. The device according to claim 3, wherein said angle adjustment means include limit switches associated with said control rod.

6. The device according to claim 1, wherein a distance between said upper plate and said lower plate, when said upper plate and said lower plate are substantially parallel, is about 10 to 11 centimeters.

7. The device according to claim 1, further including a rubber bellows positioned over said upper plate and said lower plate for protecting the space between said upper plate and said lower plate.

8. The device according to claim 1, wherein said at least one drive means comprise an electrical adjusting means.

9. The device according to claim 2, further including angle adjustment means for permitting tilting of said upper plate in relation to said lower plate around said at least one axis at an angle of about 13° to 15°.

10. The device according to claim 2, wherein a distance between said upper plate and said lower plate, when said upper plate and said lower plate are substantially parallel, is about 10 to 11 centimeters.

11. The device according to claim 2, further including a rubber bellows positioned over said upper plate and said lower plate for protecting the space between said upper plate and said lower plate.

12. The device according to claim 2, wherein said at least one drive means comprise an electrical adjusting means.

13. Automatic levelling device for a vehicle seat comprising:
   an upper plate capable of supporting a vehicle seat;
   a lower plate capable of being mounted on a vehicle;
   said upper plate being pivotally journalled to said lower plate about at least one axis;
   at least one linearly operable drive means for moving said upper plate with respect to said lower plate, said at least one drive means being mounted between and completely within the space delimited by said upper plate and said lower plate;
   at least one detecting means for detecting the horizontal position of said upper plate and for delivering a signal to said at least one drive means for returning the seat to a substantially horizontal position; and
   a control unit for receiving the signal from said at least one detecting means and providing a time delay of about 1 to 3 seconds after receiving the signal from said at least one detecting means before activating said at least one drive means.

14. The device according to claim 13, wherein said at least one drive means include a housing which is pivotally attached to a second support plate extending substantially perpendicular to said lower plate.

15. The device according to claim 13, further including angle adjustment means for permitting tilting of said upper plate in relation to said lower plate around said at least one axis at an angle of about 13° to 15°.

16. The device according to claim 13, wherein a distance between said upper plate and said lower plate, when said upper plate and said lower plate are substantially parallel, is about 10 to 11 centimeters.

17. The device according to claim 13, further including a rubber bellows positioned over said upper plate and said lower plate for protecting the space between said upper plate and said lower plate.

18. The device according to claim 13, wherein said at least one drive means comprise an electrical adjusting means.

* * * * *